US012616893B2

(12) United States Patent
Fleishman et al.

(10) Patent No.: US 12,616,893 B2
(45) Date of Patent: May 5, 2026

(54) WHEEL ASSEMBLY HAVING A LIGHT UP WHEEL HUB

(71) Applicant: Shark Wheel, Inc., Mission Viejo, CA (US)

(72) Inventors: Zack Fleishman, Ladera Ranch, CA (US); Todd Smith, Hillsboro, OR (US)

( * ) Notice: Subject to any disclaimer, the term of this patent is extended or adjusted under 35 U.S.C. 154(b) by 334 days.

(21) Appl. No.: 18/448,762

(22) Filed: Aug. 11, 2023

(65) Prior Publication Data

US 2025/0050195 A1    Feb. 13, 2025

(51) Int. Cl.
| | |
|---|---|
| *A63C 17/26* | (2006.01) |
| *A63C 17/02* | (2006.01) |
| *B60Q 1/32* | (2006.01) |
| *F03G 7/08* | (2006.01) |
| *F21V 33/00* | (2006.01) |

(Continued)

(52) U.S. Cl.
CPC ............ *A63C 17/26* (2013.01); *A63C 17/015* (2013.01); *B60Q 1/326* (2013.01); *F03G 7/081* (2021.08); *F21V 33/008* (2013.01); *A63C 2203/14* (2013.01); *F21Y 2103/33* (2016.08); *F21Y 2115/10* (2016.08)

(58) Field of Classification Search
CPC ... A63C 17/26; A63C 17/015; A63C 2203/14; B60Q 1/326; F03G 7/081; F21V 33/008; F21Y 2103/33; F21Y 2115/10
See application file for complete search history.

(56) References Cited

U.S. PATENT DOCUMENTS

| | | | | |
|---|---|---|---|---|
| 5,580,093 A | * | 12/1996 | Conway | B60Q 1/326 |
| | | | | 362/500 |
| 5,810,450 A | * | 9/1998 | Tsu | A63C 17/26 |
| | | | | 301/5.301 |
| D733,241 S | | 6/2015 | Fissell | |

(Continued)

FOREIGN PATENT DOCUMENTS

| | | | | |
|---|---|---|---|---|
| FR | 2947183 A3 | * | 12/2010 | ......... B60B 33/0049 |
| KR | 200217846 Y1 | * | 3/2001 | |

(Continued)

OTHER PUBLICATIONS

WO-0207829-A1 English Translation (Year: 2002).*

(Continued)

*Primary Examiner* — Michael T. Walsh
(74) *Attorney, Agent, or Firm* — CIONCA IP Law P.C.

(57) ABSTRACT

A wheel assembly configured to be rotationally engaged with a supported structure, the wheel assembly having a light up wheel hub having a light up ring, the light up ring having at least one light emitting device and a generator body configured to be in electrical communication with each light emitting device and an outer shell configured to be engaged with the light up ring, such that each light emitting device is enclosed within the outer shell, wherein the rotation of the light up wheel hub about a wheel rotational axis is configured to generate electrical energy to power each light emitting device. Thus an advantage is that each light emitting device may be sealed within the outer shell, protecting it from debris, fluids and other hazards. The light up wheel hub may be configured to engage with sinusoidally shaped wheel rims through selective adjustment of light emitting device positioning.

19 Claims, 9 Drawing Sheets

(51) Int. Cl.
    *F21Y 103/33* (2016.01)
    *F21Y 115/10* (2016.01)

(56) References Cited

U.S. PATENT DOCUMENTS

| | | | | |
|---|---|---|---|---|
| D738,450 | S | 9/2015 | Fissell | |
| 9,188,295 | B2 | 11/2015 | Fissell | |
| D750,187 | S | 2/2016 | Fissell | |
| 10,899,172 | B2 * | 1/2021 | Patrick ................... | B60B 19/12 |
| 2016/0008699 | A1 * | 1/2016 | Fissell ................... | A63C 17/26 |
| | | | | 310/67 R |

FOREIGN PATENT DOCUMENTS

| | | | | | |
|---|---|---|---|---|---|
| KR | 100380828 | B1 | * | 4/2003 | ............. F21K 9/237 |
| KR | 2008005618 | A | * | 1/2008 | |
| WO | WO-0207829 | A1 | * | 1/2002 | ............. A63C 17/26 |

OTHER PUBLICATIONS

KR-100380828-B1 English Translation (Year: 2003).*
FR-2947183-A3 English Translation (Year: 2010).*
KR-2008005618-A English Translation (Year: 2008).*
KR-200217846-Y1 English Translation (Year: 2001).*

* cited by examiner

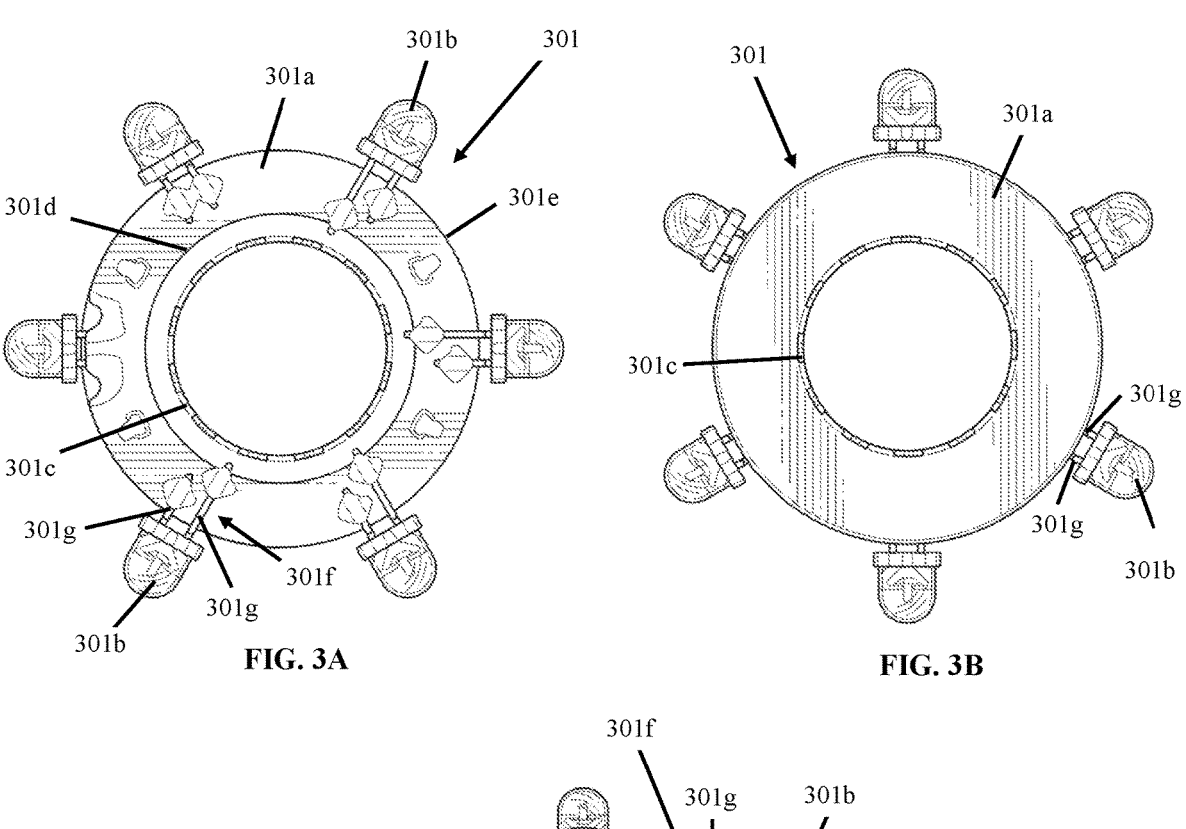
FIG. 3A
FIG. 3B
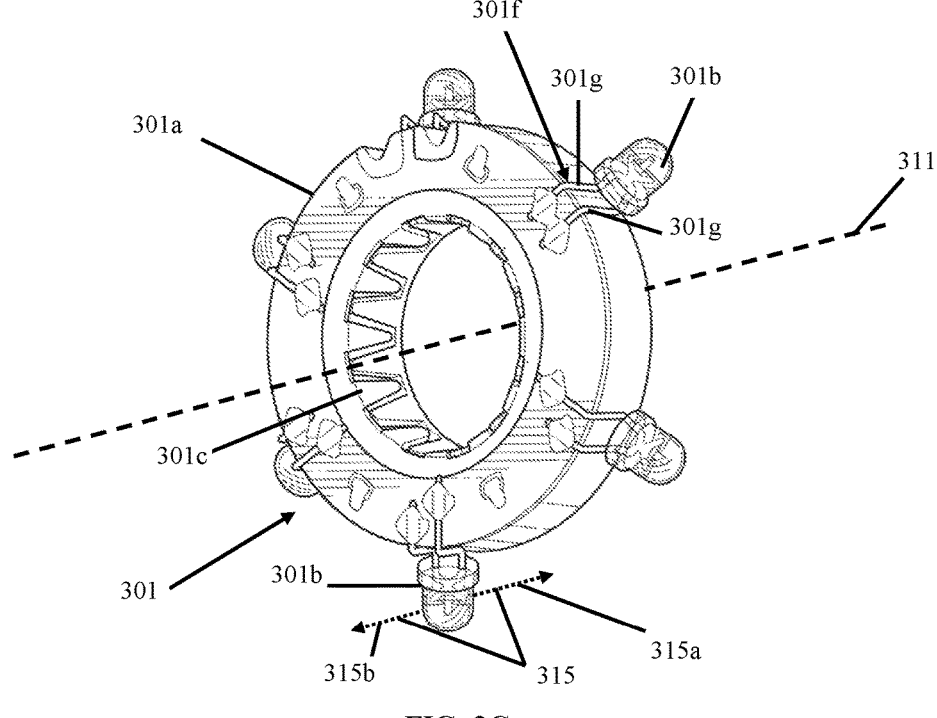
FIG. 3C

WHEEL ASSEMBLY HAVING A LIGHT UP WHEEL HUB

BACKGROUND OF INVENTION

1. Field of the Invention

The invention relates generally to wheels and specifically to wheel assemblies having light-up wheel hubs configured to secure and protect housed lighting elements.

2. Description of the Related Art

The inclusion of lighting elements on the wheels of a supported structure or vehicle may help to provide said supported structure or vehicle with a variety of benefits, both functionally and aesthetically. The inclusion of lights may provide the supported structure or vehicle with a unique and desirable appearance, that also makes the supported structure or vehicle more noticeable, particularly in low light conditions. As such, structures and vehicles that utilize lighting elements within their wheels may remain visible to others, even in the dark, thus helping prevent collisions between the structure/vehicle having said lighting elements and pedestrians or other vehicles. These lighting elements may be provided in a variety of positions, including the hubs of said wheels, wherein the hub itself may be described as a light up wheel hub.

However, currently available light up wheel hubs may have several issues and limitations that limit their implementation and longevity. Depending on how the lighting elements are implemented into the light up wheel hub, said lighting elements may not be suitably protected by the surrounding structure of the wheel or wheel hub, and thus may be exposed to water, dirt, and other debris. This may negatively influence the longevity of the lighting elements, which may be damaged by exposure to these materials. Furthermore, for embodiments having exposed portions of the lighting elements, physical impacts to the wheel may also damage the lighting elements, potentially leading to premature failure of the lighting elements. Additionally, currently available light up wheel hubs may not be configured to be implemented within wheel assemblies with alternatively shaped rims, such as sinusoidally shaped wheel assemblies (e.g., wheels having rims that reciprocate back and forth sinusoidally around the outer surface of the wheel), due to their lack of adjustability. This in turn may limit the potential applications and use-cases for said light up wheel hubs to applications in which standard, non-sinusoidal wheel shapes are utilized, which may be undesirable for certain applications.

Therefore there is a need to solve the problems described above by proving a wheel assembly having a light up wheel hub, wherein said light up wheel hub is configured to provide protection for each lighting element of the light up wheel hub, while being compatible with both conventional and sinusoidal wheel rims.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a wheel assembly configured to be rotationally engaged with a supported structure is provided, the wheel assembly comprising: a light up wheel hub having: a light up ring comprising: a ring body; a plurality of light emitting devices configured to be engaged with the ring body; and a generator body configured to be engaged with the ring body and in electrical communication with the plurality of light emitting devices; and an outer shell configured to be engaged with the light up ring, such that each light emitting device of the plurality light emitting device is configured to be enclosed within the outer shell; wherein the generator body of the light up ring is configured to be rotationally engaged with the supported structure, such that rotation of the light up wheel hub about a wheel rotational axis is configured to generate electrical energy to power the plurality of light emitting devices; and a sinusoidal wheel rim configured to surround and engage with the light up wheel hub, the sinusoidal wheel rim having: a plurality of sinusoidal ridges configured to be engaged with an outer radial perimeter of the light up wheel hub, wherein a corresponding sinusoidal valley is disposed between each adjacent pair of sinusoidal ridges; wherein each sinusoidal ridge of the plurality of sinusoidal ridges is configured to reciprocate around the outer radial perimeter of the light up wheel hub, such that each sinusoidal ridge of the plurality of sinusoidal ridges forms a continuous sinusoidal pattern around the outer radial perimeter of the light up wheel hub. Thus, an advantage is that the light up wheel hub may provide a protective cover around each light emitting device, thus preventing each light emitting device from being damaged during use. Furthermore, the nesting of the light emitting devices within the outer shell of the light up wheel hub may also protect the light emitting devices during potentially damaging steps during manufacturing and assembly, such as steps that entail molding and/or otherwise engaging the light up wheel hub with warmer materials. Another advantage is the light up wheel hub may be configured to engage with various shapes of wheel rim, such as sinusoidally shaped wheel rims, as a result of a selective lateral offset of each light emitting device within the light up ring, thus allowing for proper light emitting device positioning to optimize brightness of the light escaping the wheel assembly. Another advantage is that the light up wheel hub may be configured to power the light emitting devices via electrical energy generated solely by rolling the wheel assembly, thus removing the need for an external or auxiliary power source.

In another aspect, a wheel assembly configured to be rotationally engaged with a supported structure is provided, the wheel assembly comprising: a light up wheel hub having: a light up ring comprising: a ring body; a light emitting device configured to be engaged with the ring body; and a generator body configured to be engaged with the ring body and in electrical communication with the light emitting device; and an outer shell configured to be engaged with the light up ring, such that the light emitting device is configured to be enclosed within the outer shell; wherein the generator body of the light up ring is configured to be rotationally engaged with the supported structure, such that rotation of the light up wheel hub about a wheel rotational axis is configured to generate electrical energy to power the light emitting device; and a wheel rim configured to surround and engage with the light up wheel hub, the wheel rim having: a sinusoidal ridge configured to be engaged with an outer radial perimeter of the light up wheel hub, wherein the sinusoidal ridge is further configured to reciprocate around the outer radial perimeter of the light up wheel hub, such that the sinusoidal ridge forms a continuous sinusoidal pattern around the outer radial perimeter of the light up wheel hub. Again, an advantage is that the light up wheel hub may provide a protective cover around each light emitting device, thus preventing each light emitting device from being damaged during use. Furthermore, the nesting of the light emitting devices within the outer shell of the light up wheel hub may also protect the light emitting devices during potentially damaging steps during manufacturing and assembly, such as steps that entail molding and/or otherwise engaging the light up wheel hub with warmer materials. Another advantage is that the light up wheel hub may be configured to engage with various shapes of wheel rim, such as sinusoidally shaped wheel rims, as a result of a selective lateral offset of each light emitting device within the light up ring, thus allowing for proper light emitting device positioning to optimize brightness of the light escaping the wheel assembly. Another advantage is that the light up wheel hub may be configured to power each light emitting device via electrical energy generated solely by rolling the wheel assembly, thus removing the need for an external or auxiliary power source.

In another aspect, a wheel assembly configured to be rotationally engaged with a supported structure is provided, the wheel assembly comprising: a light up wheel hub having: a light up ring comprising: a ring body; a light emitting device configured to be engaged with the ring body; and a generator body configured to be engaged with the ring body and in electrical communication with the light emitting device; and an outer shell configured to be engaged with the light up ring, such that the light emitting device is configured to be enclosed within the outer shell; wherein the generator body of the light up ring is configured to be rotationally engaged with the supported structure, such that rotation of the light up wheel hub about a wheel rotational axis is configured to generate electrical energy to power the light emitting device. Again, an advantage is that the light up wheel hub may provide a protective cover around each light emitting device, thus preventing each light emitting device from being damaged during use. Furthermore, the nesting of the light emitting devices within the outer shell of the light up wheel hub may also protect the light emitting devices during potentially damaging steps during manufacturing and assembly, such as steps that entail molding and/or otherwise engaging the light up wheel hub with warmer materials. Another advantage is the light up wheel hub may be configured to engage with various shapes of wheel rim, such as sinusoidally shaped wheel rims, as a result of a selective lateral offset of each light emitting device within the light up ring, thus allowing for proper light emitting device positioning to optimize brightness of the light escaping the wheel assembly. Another advantage is that the light up wheel hub may be configured to power each light emitting device via electrical energy generated solely by rolling the wheel assembly, thus removing the need for an external or auxiliary power source.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 3A-3C illustrate the front elevation, rear elevation and front-right perspective views, respectively, of a light up ring, according to an aspect.

DETAILED DESCRIPTION

Figure 1A:
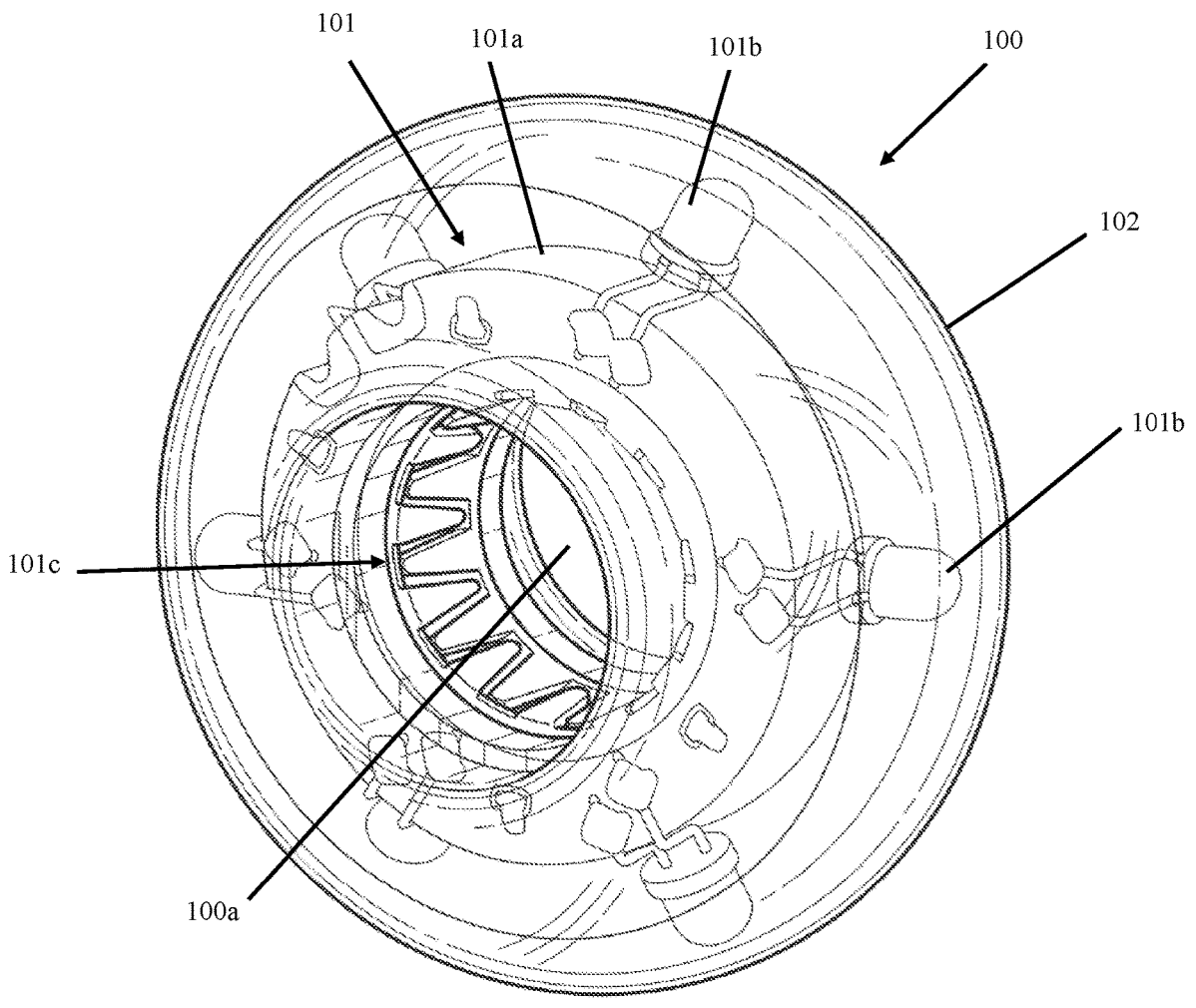
FIG. 1A-1D illustrate the front-right perspective, front elevation, rear elevation and right side elevation views, respectively, of a light up wheel hub, according to an aspect.
Figures 1B, 1C, 1D:
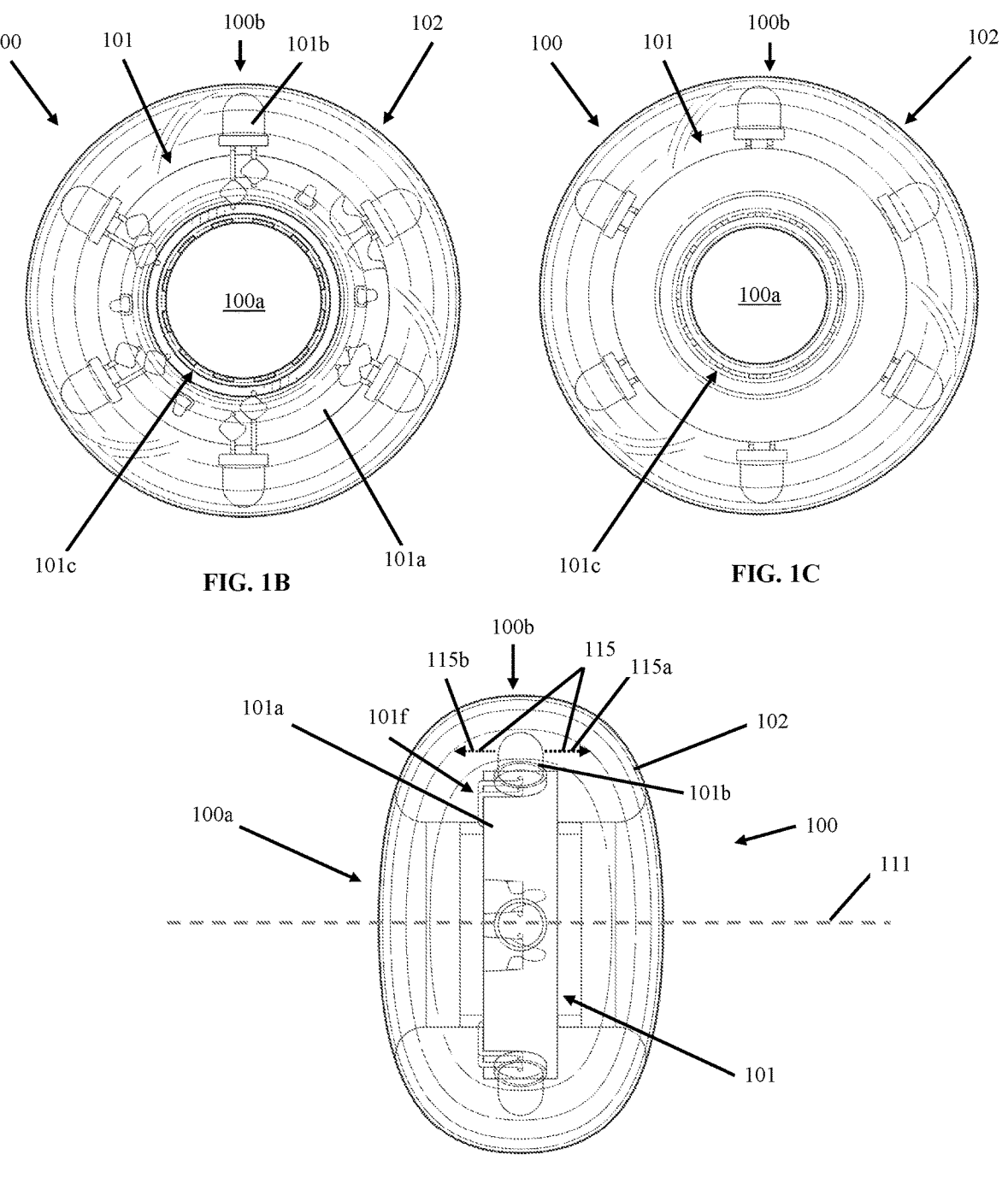

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 111 and 211, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1A-1D illustrate the front-right perspective, front elevation, rear elevation and right side elevation views, respectively, of a light up wheel hub ("wheel hub") 100, according to an aspect. The light up wheel hub 100 may be provided as part of a wheel assembly on a skateboard, roller-skate or other mode of transit, as well as other wheeled objects, such as structures having caster assemblies. As can be seen in FIG. 1A-1D, the light up wheel hub 100 may comprise a transparent outer shell 102 and a light up ring 101 partially nested within or otherwise engaged the transparent outer shell 102. In the embodiment of FIG. 1A-1D, the outer shell 102 may have a toroidal shape, such that the light up wheel hub 100 has a toroidal shape, wherein a generator body 101c of the light up ring 101 may be disposed within an inner loop portion 100a of the wheel hub 100. This inner loop portion 100a of the light up wheel hub, and/or the generator body 101c of the light up ring 101 may be configured to engaged or associated with a magnetic bearing, such as magnetic bearing 612 of FIG. 6A, to facilitate powering of the light up ring 101 as the light up wheel hub 100 rotates, as will be discussed in greater detail hereinbelow. It should be understood that the generator body 101c may be any suitably compatible device configured to work in conjunction with the magnetic bearing to generate electrical energy from the rotation of the associated wheel hub 100 about a wheel rotational axis 111.

In an embodiment, the light up ring 101 may comprise a ring body 101a, a plurality of light emitting devices 101b engaged or otherwise associated with the ring body 101a and a generator body 101c configured to be engaged or associated with the ring body 101a, wherein each light emitting device 101b of the plurality of light emitting devices is configured to be in electrical communication with the generator body 101c. It should be understood that while the generator body 101c of the light up ring 101 may be configured to be partially exposed to the external environment and engaged or associated with a magnetic bearing, the plurality of light emitting devices 101b may be configured to be completely sealed or otherwise enclosed within the outer shell 102 of the wheel hub 100. As such, the plurality of light emitting devices 101b may be protected from impacts, debris, water damage and various other sources of damage that are common to wheels and other similar technologies. The disposition of the generator body 101c on the inner loop portion 100a of the wheel hub 100 allows for a supported structure, such as a corresponding axle 605a of a skateboard truck 605, as seen in FIG. 6B, to be nested within/inserted into the inner loop portion 100a, thus facilitating rotational engagement between the light up wheel hub 101 and the supported structure.

Figure 6A:
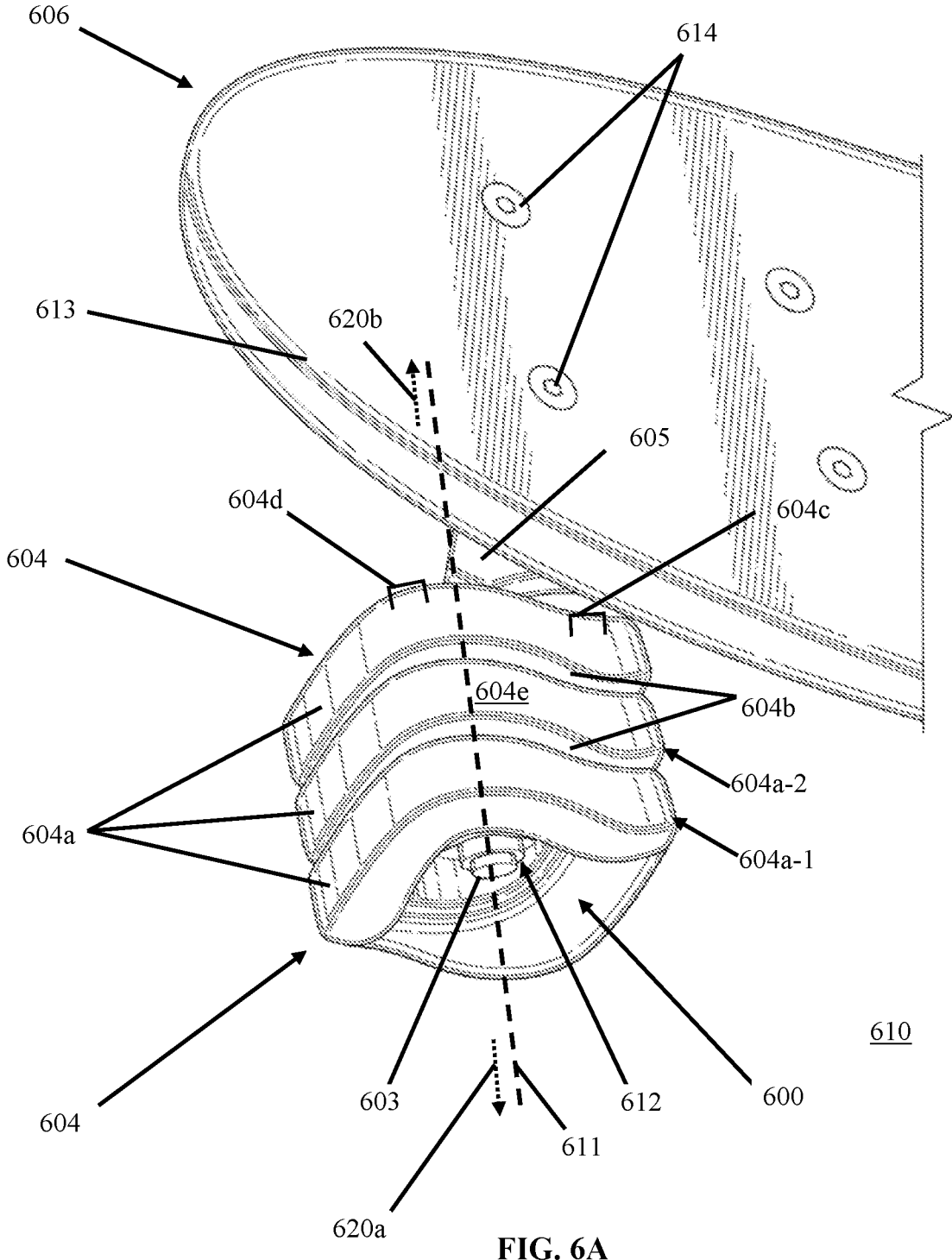
FIG. 6A-6B illustrate side and bottom perspective views, respectively, of a skateboard having a plurality of wheels with light up wheel hubs, according to an aspect.
Figure 6B:
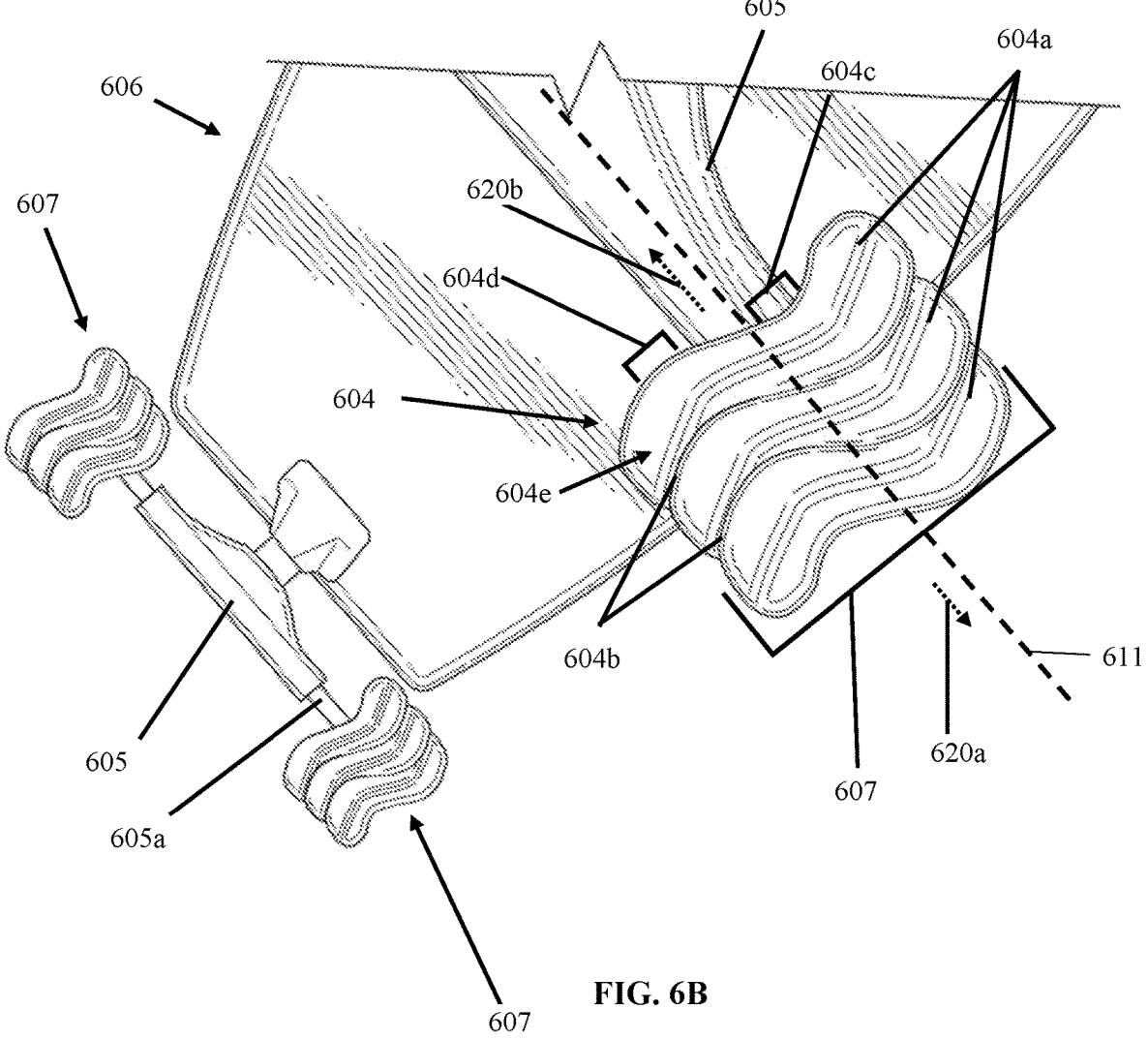

It should be understood that FIG. 1A-1D may only show the light up wheel hub 100 portion of an overall wheel assembly, such as wheel assembly 607 of FIG. 6A-6B. Said wheel assembly may comprise the disclosed light up wheel hub 100 as well as a wheel rim, such as wheel rim 604 of FIG. 6A, disposed around and engaged with the wheel hub. It should be understood that the light up wheel hub 100 may be configured to allow for suitable light emitting device positioning to ensure proper emission of light through the wheel rim, as will be described in greater detail hereinbelow. In an embodiment, as the light up wheel hub 100 rotates about the wheel rotational axis 111 via its rotational engagement with the attached axle, and thus the magnetic bearing, an electrical current may be generated by the generator body 101c and utilized to power the light emitting devices 101b disposed on the light up ring 101.

In an embodiment, the wheel rim may be configured to engage with the outer radial perimeter 100b of the light up wheel hub 100, such that the wheel rim engages directly with the outer shell 102 of the light up wheel hub. In an embodiment, the light up wheel hub 100 may be configured such that an air gap ("hollow cavity") is formed between the light up ring 101 and the outer shell 102, such that the plurality of light emitting devices 101b are disposed within the air gap. The engagement of the light up wheel hub 100 with a wheel rim will be discussed in greater detail hereinbelow. It should be noted that the outer shell 102 may not be transparent in embodiments wherein visual concealment of the light emitting devices 101b is desirable, as seen in FIG. 2A-2C described hereinbelow.

In an embodiment, the disclosed light up ring 101 may be configured to be adjustable, such that the same model of light up ring 101 may be used within different types of wheel assemblies having different rim shapes. Each light emitting device 101b may be attached to the ring body 101a and in electrical communication with the generator body 101c through a corresponding light clip 101f. This light clip 101f may be bendable or otherwise adjustable, such that the lateral offset 115 of each light emitting device 101b may be adjusted along the wheel rotational axis 111 (e.g., in the opposing lateral directions 115a, 115b that define the wheel rotational axis 111). The adjustable lateral offset 115 of each light emitting device 101b will be discussed in greater detail hereinbelow.

Figures 2A, 2B, 2C:
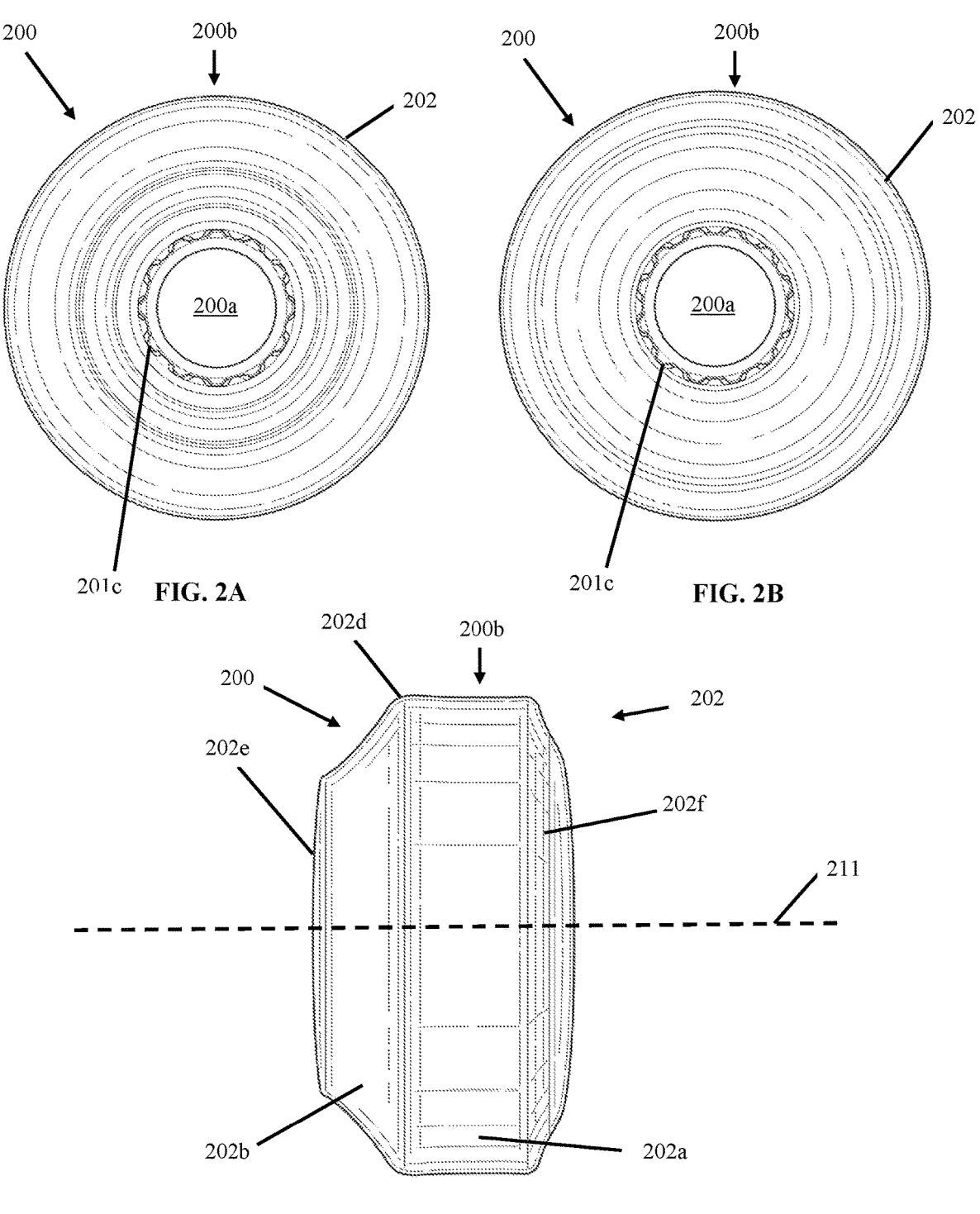
FIG. 2A-2C illustrate the front elevation, rear elevation and left side elevation views, respectively, of an alternative light up wheel hub, according to an aspect.

FIG. 2A-2C illustrate the front elevation, rear elevation and left side elevation views, respectively, of an alternative light up wheel hub 200, according to an aspect. While not visible due to the translucent, but not transparent, outer shell 202 of the light up wheel hub 200, it should be understood that a light up ring may be partially nested within the translucent outer shell 202, such that a plurality of light emitting devices on said light up ring are securely housed within the translucent outer shell 202. The generator body 201c of the light up ring may be disposed within the inner loop portion 200a of the wheel hub 200 for engagement or association with a magnetic bearing, to facilitate powering of the light emitting devices attached to the light up wheel hub. While the translucent outer shell 202 may make it difficult or impossible for the light emitting devices, such as light emitting device 101b of FIG. 1A, to be seen from the outside of the light up hub 200, it should be understood that the light emitted from each light emitting device may be seen clearly upon being provided with sufficient power, via rotation of the light up wheel hub 200 about the wheel rotational axis 211. As disclosed hereinabove, the outer radial perimeter 200b of the light up wheel hub 200 may be configured to engage with a wheel rim. This engagement of the wheel rim with the light up wheel hub 200 may result in direct engagement between the outer shell 202 and the wheel rim.

Aside from the disclosed outer shell 202 of the alternative light up wheel hub 200 being translucent, the outer shell 202 of the alternative light up wheel hub 200 may also have a different shape than that of the light up wheel hub 100 of FIG. 1A-1D. As can be seen in FIG. 2C, the outer shell 202 of the alternative light up wheel hub 200 may have a main body portion 202a having a right circular cylinder shape, an inner tapered end portion 202b associated with the main body portion 202a by the larger end 202d of said inner tapered end portion 202b, and an outer cap portion 202f associated with the main body portion 202a, such that the main body portion 202a is disposed between the inner tapered end portion 202b and the outer cap portion 202f. In an embodiment, a narrower portion 202e of the inner tapered end portion 202b of the translucent outer shell 202 may face toward the attached structure, such as a skateboard, whereas the outer cap portion 202f of the translucent outer shell 202 may face away from the attached structure. It should be understood that, in addition to the wheel hub shapes of FIG. 1A-2C shown above, the light up wheel hub 200 for a particular wheel assembly may be suitably adapted to provide the desired performance and appearance for the intended application.

FIG. 3A-3C illustrate the front elevation, rear elevation and front-right perspective views, respectively, of a light up ring 301, according to an aspect. As disclosed hereinabove, the light up ring 301 may be configured to provide the described "light up" capabilities to the light up wheel hub described hereinabove. The light up ring 301 may comprise a ring body 301a having a roughly cylindrical shape, as well as at least one light emitting device 301b and a generator body 301c engaged or associated with the ring body 301a, wherein the generator body 301c is disposed on a cylindrical inner surface 301d of the ring body 301a and each light emitting device 301c is disposed on a cylindrical outer surface 301e of the ring body 301a. As disclosed hereinabove, the generator body 301c may be in electrical communication with each light emitting device 301b.

Each light emitting device 301b may protrude out radially from the cylindrical outer surface 301e of the ring body 301a, as seen in FIG. 3A-3C. The light emitting devices 301b may be in electrical communication with the ring body 301a and generator body 301c through known electrical interconnection methods, including but not limited to soldering, electrical wiring, etc. Each light emitting devices 301b may be any suitable light emitting device that is configured to be powered by the energy generated from the rotational interaction between the generator body 301c and supported structure (e.g., rotation of the generator body 301c about an axle of a supported structure), including but not limited to light emitting diodes (LEDs) or other compact lighting devices. In an embodiment, the ring body 301a may be in electrical communication with both the generator body 301c and each light emitting device 301b, and thus may act as an electrical bridge and facilitate electrical communication between the generator body 301c and each light emitting device 301b.

As can be seen in FIG. 3A-3C, each light emitting device 301b may be engaged with and in electrical communication with the ring body 301a through a corresponding light clip ("clip") 301f. Each light clip 301f may have a pair of clip legs 301g configured to electrically (and physically) engage the corresponding light emitting device 301b with the ring body 301a and generator body 301c to enable the lighting up of each light emitting device 301b as the light up ring 301 rotates with the light up wheel hub. Each clip leg 301g may be sufficiently flexible to allow for the attached light emitting devices 301b to be bent or otherwise selectively adjusted in a desired direction to laterally offset 315 the corresponding light emitting device 301b along the wheel rotational axis 311 (e.g., in the opposing lateral directions 315a, 315b defined by the wheel rotational axis 311). As such, the same light up ring 301 may be utilized for wheel assemblies having alternatively shaped rims, such as wheel assembly 607 of FIG. 6A. In the wheel rim embodiment of FIG. 4, the light emitting devices 301b may be bent in alternating directions (e.g., adjacent light emitting devices may be configured to tilt or bend in opposing lateral directions 315a, 315b along the wheel rotational axis 311) such that the light emitting devices 301b are configured to fit into the corresponding light pockets 402c associated with the outer shell 402. In another embodiment, each light emitting device 301b may be adjusted based on the thickness of the wheel rim, as will be discussed in greater detail hereinbelow.

As seen in FIG. 6A-6C, the rim 604 (and/or a ridge 604a of the rim) of a wheel assembly 607 may form a sinusoidal curve having a sinusoidal frequency and amplitude. The resultant sinusoidal pattern that this sinusoidal curve follows may have a whole number of periods (e.g. full cycles through the sinusoidal pattern) as it wraps around the wheel, such that the resultant sinusoidal pattern/curve is continuous and uninterrupted. In said embodiment, each light clip 301f may be suitably bent or otherwise adjusted, such that the light emitting devices 301b engaged with the light up ring 301 also forms a complementary sinusoidal pattern, such that the sinusoidal pattern formed by the wheel rim (or more specifically its sinusoidal ridges) and the sinusoidal pattern formed by the plurality of light emitting devices 301b are "in phase" with each other.

It should be understood that two sinusoidal patterns are "in phase" with each other if they have the same frequency (e.g., number of periods formed along the wheel rim) and their corresponding peaks and troughs are aligned (e.g., occur at the same radial angle of a wheel) on a corresponding surface, as seen with the sinusoidal ridges 604a of FIG. 6A-6B. Alternatively, the plurality of light emitting devices 301b may themselves not form or execute a visible sinusoidal pattern, but may merely be positioned in a particular manner that aligns with a corresponding portion of a sinusoidal wheel rim or another shape of wheel rim, as will be described hereinbelow. In an embodiment, the plurality of light emitting devices 301b may be adjusted in such a way that each light emitting device 301b is positioned to be sufficiently close to a corresponding valley within the wheel rim, such that each light emitting device 301b shines brightly through the corresponding valley in the wheel rim, as will be described in greater detail hereinbelow.

By utilizing a structure for the light up ring 301 that is configured to be adjusted as needed based on the specific shape of the wheel assembly (standard/circular, sinusoidal, etc.) it is installed within, manufacturing costs for the disclosed light up hubs may be reduced accordingly. In an embodiment, the frequency and amplitude of a sinusoidal pattern formed by the plurality of light emitting devices 301b around the cylindrical outer surface 301e of the ring body 301a may be adjusted in accordance with the shape, size, etc., of the wheel rim of the corresponding wheel assembly.

As disclosed hereinabove, the light up ring 301 may comprise a generator body 301c in electrical communication with the ring body 301a. As such, the generator body 301c may also be in electrical communication with each light emitting device of the plurality of light emitting devices 301b. As is understood, the rotation of the light up ring 301 about a corresponding portion of the supported structure (such as a skateboard) may result in the generation of electrical energy. This generated electrical energy may thusly be utilized to actuate or power each light emitting device 301b (e.g., cause the light emitting device to emit light) as the light up ring 301 (and the surrounding light up wheel hub) rotates about the magnetic bearing, such as magnetic bearing 612 of FIG. 6A. This in turn may result in each light emitting device 301b lighting up if a certain rotational speed of the light up ring 301 around the wheel rotational axis 311 is exceeded. As such, a supported structure utilizing wheel assemblies having these light up rings 301 may emit flashes of light as it travels, by virtue of the rotation of each wheel and resultant powering of each light emitting device 301b.

In an embodiment, the light up ring 301, the axle of the supported structure rotationally engaged with the light up ring 301 and the described magnetic bearing, such as magnetic bearing 612 of FIG. 6A, may together be described as a "generator assembly". Unlike a conventional generator which would generate electrical energy via rotation of a shaft within a stationary generator body, the light up ring 301 having the generator body 301c may itself rotate around the axle, wherein the axle may function as a stationary shaft secured to a rotating generator body 301c. Again, the pivotal engagement between the light up ring 301 and the supported structure is configured to provide electrical energy to the light emitting devices 301*b* on the light up ring 301 upon rotation of the light up ring 301 about the wheel rotational axis 311. As is understood, the magnetic bearing may comprise a stationary portion (not shown) engaged with the supported structure, a rotary portion (not shown) engaged with a portion of light up wheel hub, such as the generator body 301*c* of the light up ring 301 and/or the inner loop portion of the light up wheel hub, and a bearing gap (not shown) disposed between the stationary portion and the rotary portion to facilitate smooth rotation of the rotary portion and its attached elements about the stationary portion. This in turn facilitates smooth rotation of the light up wheel hub and its light up ring 301 about the wheel rotational axis 311, wherein the magnetic bearing is disposed between the light up wheel hub and a corresponding axle of the supported structure.

It should be understood that the size, quantity, emitted light color, etc., of each light emitting device 301*b* may be suitably modified to fit the user's preference/needs. In an embodiment, the plurality of light emitting devices may comprise six light emitting diodes of varying colors (red, green, blue, yellow, etc.), wherein each light emitting diode is configured to be securely nested within the outer shell of the light up wheel hub. In said embodiment, each light emitting device 301*b* of the six light emitting devices 301*b* may be equidistantly spaced along the cylindrical outer surface 301*e* of the ring body 301*a*. In an alternative embodiment, a singular light emitting device or different quantity of light emitting device may be nested within the outer shell of the light up wheel hub.

Regardless of the characteristics of the plurality light emitting devices 301*b*, each light emitting device 301*b* may be appropriately positioned within the light up wheel hub for optimized light emission through the wheel assembly, regardless of the surrounding outer shell and the characteristics of a surrounding wheel rim (e.g., quantity/shape of rim ridges, number of sinusoidal periods formed by wheel ridges, etc.) In an embodiment, each light emitting device 301*b* may be positioned such that the thickness of the material disposed between the light emitting device and the external environment is minimized. In said embodiment, this minimization of distance between the light emitting device 301*b* and the external environment, while still optimizing the amount protection provided said light emitting device, may be done by positioning the light emitting device close to a valley in the wheel rim, as will be described in greater detail hereinbelow.

Figure 4:
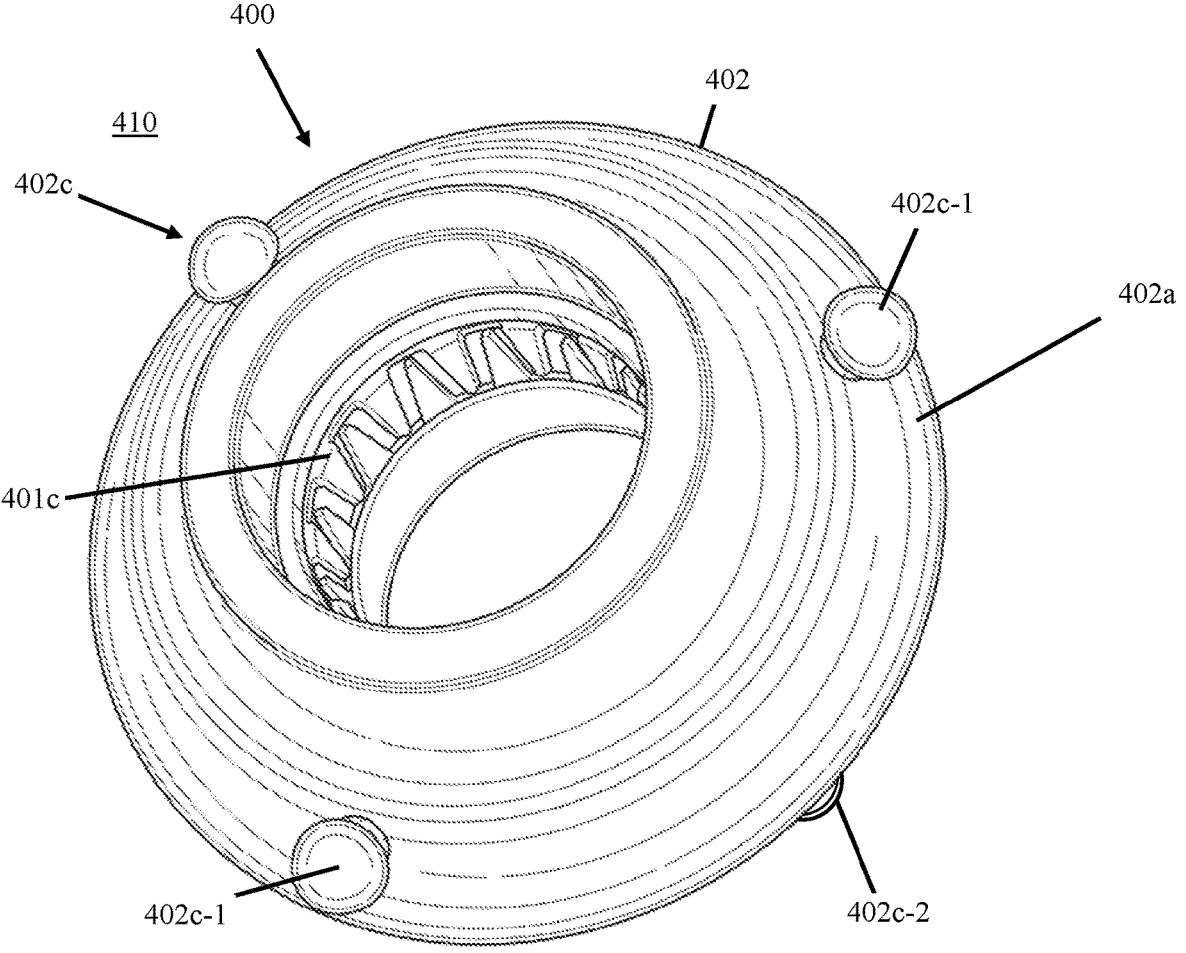
FIG. 4 illustrates a front-right perspective view of an alternative light up wheel hub having a modified outer shell, according to an aspect.

FIG. 4 illustrates a front-right perspective view of an alternative light up wheel hub 400 having a modified outer shell 402, according to an aspect. In order to optimize the intensity of the light emitted from the light up wheel hub 400 into the external environment 410, while still suitably protecting each light emitting device, such as light emitting device 301*b* of FIGS. 3A-3B, the structure of the outer shell 402 may be modified accordingly. In an embodiment, the outer shell 402 of a light up hub 400 may further comprise a plurality of light emitting device pockets ("light pockets") 402*c*, wherein each light emitting device pocket 402*c* protrudes off from a main body portion 402*a* of the outer shell 402, as seen in FIG. 4. As is understood, due to the adjustability of the light up ring 301 of FIG. 3, the same light up ring 301 may be adjusted for different shapes of wheel hub and wheel rim.

As described hereinabove, the clip attached to each light emitting device of the plurality of light emitting devices, such as clip 301*f* of FIG. 3A, may be configured to be bent into an alternating pattern, such that each light emitting device bending in a first direction is disposed between light emitting devices bending in a second, opposite direction. To complement this alternating pattern formed by the light emitting devices, the light pockets 402*c* may be disposed in complementary alternating positions on the outer shell 402, such that each light pocket protruding in a first direction 402*c*-1 may be disposed between two corresponding light pockets protruding in a second, opposing direction 402*c*-2, as seen in FIG. 4. In an embodiment, each light pocket 402*c* of the plurality of light pockets may be configured to surround and protect a corresponding light emitting device of the plurality of light emitting devices.

This particular configuration of light up hub 400 having light pockets 402*c* may allow the light emitting devices secured within the outer shell 402 to shine more visibly (when compared to being positioned inside the outer shell 402, but not within a light pocket 402*c*), such that the light escaping the light up wheel hub 400 into the external environment 410 appears to be more intense/brighter than if it had to permeate through a thicker layer of outer shell material. As a result of the light emitting devices still being suitably enclosed within the outer shell 402 in this alternative embodiment, protection of the light emitting devices from impacts, dirt, debris, water, etc., may be provided while allowing the emitted light to appear more intense. Again, unlike the light emitting devices of the light up ring, the generator body 401*c* of the light up ring may remain exposed to the external environment 410, such that generation of a sufficient electrical energy during wheel rotation may be established and maintained.

Figure 5:
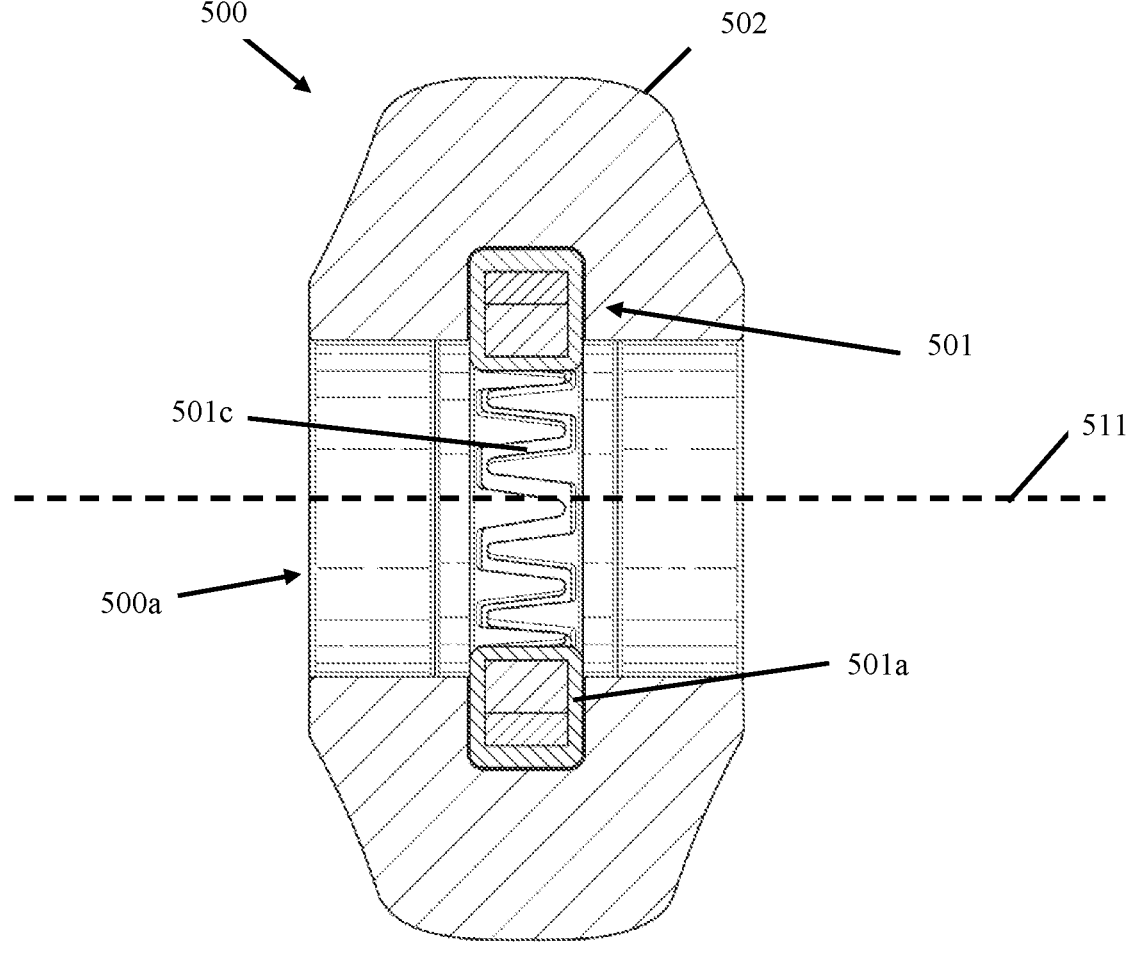
FIG. 5 illustrates a side cross-sectional view of an alternative light up wheel hub, according to an aspect.

FIG. 5 illustrates a side cross-sectional view of a light up wheel hub 500, according to an aspect. In an embodiment, regardless of the particular shape and configuration of the outer shell 502 of a light up wheel hub 500, the generator body 501*c* of the light up ring 501 may remain within the inner loop portion 500*a* of the light up wheel hub 500, thus facilitating suitable engagement between the light up ring 501 and a magnetic bearing attached to the supported structure. The ring body 501*a* may be utilized to create an electrical connection between the generator body 501*c* and the light emitting devices, as disclosed hereinabove.

In order to provide suitable protection to the light emitting devices nested within the outer shell 502 to prevent premature failure said light emitting devices, said outer shell may be made of a suitably durable material that is configured to prevent a shock imparted on the outer shell 502 from being exerted on the light up ring 501 or its light emitting devices. In an embodiment, the outer shell 502 may be made of polyurethane, another durable polymer or material. It should be understood that the outer shell 502 may be made of a material that is capable of suitably sealing the light emitting devices within the light up wheel hub 500 to protect them from external elements and damage.

In an embodiment, the light up ring 501 and each of its elements may be made of suitable materials to facilitate the generation of electrical energy and resultant powering of the attached light emitting devices upon rotation of the light up wheel hub 500 and its generator body 501*c* around a corresponding part of the magnetic bearing. In an embodiment, the generator body 501*c* of the light up ring 501 may be made out of steel and other suitable materials to facilitate electrical power generation upon rotation about the wheel rotational axis 511.

Depending on the desired properties of the light up wheel hub 500, the amount of material utilized for the outer shell may be varied. As can be seen in FIGS. 5, the outer shell 502 may have greater thickness, such that no air gap exists between the light up ring 501 and the outer 502. This particular configuration may have the benefit of providing a studier wheel hub. In an alternative embodiment, as seen in FIG. 1A, the outer shell may be provided with a lesser thickness, such that an air gap is present between the light up wheel ring 101 and the outer shell 102. This configuration, in contrast, may be useful if weight minimization for the light up wheel is desired. Regardless of the amount of material used/thickness of the outer shell 502, it should be understood that the outer shell may be configured to suitably protect the light up ring for a desired application.

FIG. 6A-6B illustrate side and bottom perspective views, respectively, of a skateboard 606 having a plurality of wheel assemblies ("wheels") 607 with light up wheel hubs 600, according to an aspect. As described hereinabove, the disclosed light up wheel hubs 600 may be used as a part of a wheel assembly 607 configured to attach to a supported structure, such as a skateboard 606 or another vehicle. Each wheel assembly 607 may comprise a wheel rim 604 engaged with a light up wheel hub 600, such that the wheel rim 604 is configured to contact the ground as the wheel assembly 607 rotates about a wheel rotation axis 611 during travel. In an embodiment, the wheel rim 604 may engage with the outer radial perimeter of the wheel hub 600, such that the wheel hub 600 does not come into direct contact with the ground during use, thus further protecting the light emitting devices sealed within the wheel hub 600. The light up wheel hub 600, the wheel rim 604, and thus the overall wheel assembly 607 may be configured to be coaxially aligned with the wheel rotational axis 611, as seen in FIG. 6A.

As can be seen in FIG. 6A-6B, the wheel rim 604 may have a plurality of continuous, sinusoidal ridges 604*a* configured to engage with the outer radial perimeter of the light up wheel hub 600, such as outer radial perimeter 200*b* of FIG. 2. In an embodiment, the wheel rim 604 may have three continuous sinusoidal ridges 604*a*, wherein a sinusoidal valley 604*b* is disposed between each adjacent pair (604*a*-1, 604*a*-2) of sinusoidal ridges 604, for a total of two sinusoidal valleys 604*b* in the present embodiment. It should be understood that each sinusoidal ridge 604*a* and each sinusoidal valley 604*b* may reciprocate (e.g., move back and forth in the opposing lateral directions 620*a*, 620*b* defined by the wheel rotational axis) as they "travel" around the wheel hub 600 (e.g., each sinusoidal ridge 604*a* and valley 604*b* may bend back and forth in the direction of the wheel rotational axis) thus forming a continuous sinusoidal pattern around the outer radial perimeter of the light up wheel hub 600. In other words, each sinusoidal ridge 604*a* and sinusoidal valley 604*b* may be configured to reciprocate around the outer radial perimeter of the light up wheel hub, such that each sinusoidal ridge 604*a* and sinusoidal valley forms a continuous sinusoidal pattern around the outer radial perimeter of the light up wheel hub. The amplitude of the sinusoidal pattern may be defined by the corresponding lateral offset of the sinusoidal ridge 604*a*/valley 604*b* on a particular portion/radial angle of the wheel rim 604. In an alternative embodiment, the wheel rim 604 may comprise only a singular sinusoidal ridge 604*a* or two or more sinusoidal ridges 604*a*. The wheel assembly may exhibit the benefits of having a sinusoidal wheel arrangement as long as the wheel rim 604 comprises at least one sinusoidal ridge 604*a*.

In said embodiment, each sinusoidal ridge 604*a* and sinusoidal valley 604*b*, and thus the wheel rim overall, may be coaxially aligned with wheel rotational axis 611. Furthermore, each sinusoidal ridge 604*a* and sinusoidal valley 604*b* may be "in phase" with each other, such that each sinusoidal ridge 604*a* and sinusoidal valley 604*b* reaches its axial displacement peaks 604*c* and axial displacement troughs 604*d* (maximal displacements in a first lateral direction 620*a* and maximal displacements in a second, opposing lateral direction 620*b* along the wheel rotational axis 611, respectively) at a same radial angle(s) on the outer surface of the wheel rim 604, as seen in FIG. 6A. It should be understood that the wheel 607 described above and shown in FIG. 6A-7 may be referred to as a "sinusoidal wheel" or "sinusoidal wheel assembly" herein. Furthermore, it should be understood that the exact quantity, size and other characteristics (e.g., frequency/quantity of sinusoidal periods formed by the sinusoidal ridges 604*a* around the perimeter of the wheel 607, sinusoidal amplitude, etc.) of the sinusoidal ridges 604*a* and sinusoidal valleys 604*b* on the wheel rim 604 may be varied based upon the needs of the application, wherein the same type of hub 600 may be configured to be engaged/associated with the wheel rim 604 regardless of their quantity, size or other characteristics.

As described hereinabove, the light up wheel hubs 600 may be configured to be adjusted depending on the characteristics of the wheel rim 604 and the wheel assembly 607 overall, to optimize the positioning of each light emitting device to maximize the apparent brightness of the emitted light. As is understood, the brightness of the light escaping the wheel assembly 607 may be dependent upon the variable thickness of the wheel rim 604, as a result of the plurality of sinusoidal ridges 604*a* and each corresponding sinusoidal valley 604*b*. As can be seen in FIG. 6A-6B, the wheel rim 604 may have a greater thickness at portions of the wheel rim 604 having sinusoidal ridges 604*a* and a lesser thickness at portions of the wheel rim 604 having sinusoidal valleys 604*b*. As such, light traveling through the wheel rim 604 into the external environment 610 may appear brighter and more noticeable in the sinusoidal valleys 604*b* and dimmer in the sinusoidal ridges 604*a*. In order to maximize the apparent output of light through the sinusoidal valleys 604*b*, each light emitting device may be suitably laterally offset by bending its engaged clip in a corresponding opposing lateral direction 620*a*, 620*b*.

In an embodiment having two sinusoidal valleys 604*b* on the wheel rim 604, such as the wheel assembly 607 of FIG. 6A-6B, the light emitting devices may be suitably positioned such that they are equidistantly disposed between the two sinusoidal valleys 604*b*, such that both sinusoidal valleys 604*b* appear equally bright upon emission of light from each light emitting device. In an alternative embodiment, each light emitting device may be positioned such that it is disposed closer to a corresponding sinusoidal valley 604*b*, such that emission of light through the wheel rim 604 is maximized through said corresponding valley 604*b* for each light emitting device. Regardless of the specific size and shape of the overall wheel assembly and the lighting preferences of the manufacturer/consumer, the adjustable lateral offset of each light emitting device on the light up ring, such as light up ring 301 of FIG. 3, as a result of their adjustable light clips, may allow for the same light up ring structure to be adapted to various different use cases. Furthermore, As disclosed hereinabove, despite the adjustability of each light emitting device, all light emitting devices may remain enclosed and protected within the outer shell.

Again, this particular arrangement of sinusoidal ridges 604*a* and valleys 604*b* on the wheel assembly 607 is configured such that the amount/thickness of material between the light emitting devices and the external environment 610 is minimized within the sinusoidal valleys 604*b*. As such, the light emitted from the light emitting devices may appear brightest in the sinusoidal valleys 604*b*, or any other wheel rim portion having a lesser thickness, thus providing a distinct appearance that allows for the contained light to permeate through the wheel 607 and out into the external environment 610 with greater intensity in said regions. In an embodiment, the lateral offset of each light emitting device, such as lateral offset 315 of FIG. 3C, may be adjusted in the opposing directions 620*a*, 620*b* defined by the wheel rotational axis 611 accordingly, to maximize light emission through each sinusoidal valley, thus maximizing apparent brightness and visibility of the light up wheels in low light environments.

It should be understood that the light up hub 600 is suitably configured to emit a light strong enough to be clearly seen through the outer shell of the light up wheel hub 600, as well as the wheel rim 604. As such, the wheel hub 600 and wheel rim 604 may be made of a material that is sufficiently translucent or transparent to allow for the light emitted from the light emitting devices to be visible from the external environment 610 while in use. Again, it should be understood that the skateboard or other attached structure/vehicle may need to achieve a certain speed (e.g., a certain wheel RPM around the wheel rotational axis 611) to facilitate the generation of sufficient electrical energy to light up the light emitting devices to emit a flash of light into the external environment 610.

In order to facilitate the rolling of the skateboard 606, each wheel 607 may be configured to engage with the axle 605*a* of a truck 605 via a magnetic bearing 612 and an axle nut 603. The magnetic bearing 612 may be configured to engage with the axle 605*a* and the light up wheel hub, wherein the generator body, such as generator body 301*c* of FIG. 3A, may be configured to engage with and surround the magnetic bearing 612 to facilitate rotational engagement of the light up wheel hub 600 (and thus the wheel 607) with the axle 605*a* of the truck 605. An axle nut 603 may be secured to the axle 605*a* of the truck 605 following the engagement of the wheel assembly 607 with the magnetic bearing 612 to prevent the corresponding wheel 607 from falling off of the truck 605 during use. Each truck 605 may be configured to engage directly with the skateboard deck 613 via truck screws 614, or any other suitable fastener.

In an embodiment, the skateboard 606 may comprise a skateboard deck 613, two truck 605 engaged with the skateboard deck 613, and two wheels 607 rotationally engaged with each truck 605, for a total of four wheels 607. It should be understood that the quantity of trucks 605 and the quantity of wheels 607 engaged with a supported structure or vehicle may be suitably modified based on the structure/vehicle, as well as the intended application. In an alternative embodiment, a structure may be engaged with three trucks 605, each of which is engaged with two wheels 607, for a total of six wheels engaged with the structure. Furthermore, the disclosed wheels 607 may be configured to attach to alternative mounting elements in structures lacking trucks, such as caster assemblies.

It should be understood that the sinusoidal ridges 604*a* of the wheel rim 604 disposed on the outer surface of each sinusoidal wheel 607 may impart a variety of benefits and advantages upon the attached structure. Sinusoidal wheels may experience less drag and resistance while turning and pivoting, thus resulting in higher travel speeds and longer travel distances with the same amount of initial push force. Depending on the structure that the sinusoidal wheels 607, the sinusoidal wheels may also help provide a unique visual aesthetic as they roll, due to the reciprocating sinusoidal offset of the wheel rim 604 and its sinusoidal ridges 604*a* and valleys 604*b*.

In an embodiment, a wheel assembly having a sinusoidal rim may experience reduced resistance to rolling when compared to a wheel assembly having a rim with a standard, right circular cylinder shape, wherein both rims otherwise have the same properties (contact surface area, material, tread depth, etc.) In said embodiment, said sinusoidal rim may experience about 57% less resistance while rolling across a surface, thus increasing the travel efficiency of a supported structure. Additionally, wheel rims 604 having the disclosed plurality of sinusoidal ridges 604*a* may also maintain lateral grip when sliding the wheel, wherein said sinusoidal ridges provide a controllable and predictable slide. Furthermore, wheels having sinusoidal rims may tend to push small objects to either the left or right of the wheel as it rolls, thus smoothing out the ride of the supported structure as it travels.

An important consideration to make in providing a suitable light up wheel hub 600 for a wheel assembly 607 is the conditions that more vulnerable elements of the light up wheel hub 600, such as light emitting devices 301*b* of FIG. 3A, will be exposed to during manufacturing and assembly. In an embodiment, a wheel rim 604 may be associated with the light up wheel hub 600 by pouring hot polyurethane over the wheel hub 600 while said wheel hub 600 is placed within a correspondingly shaped mold, to achieve a desired wheel rim shape. In said embodiment, the mold may be configured to produce a sinusoidally shaped wheel rim having a shape comparable to wheel rim 604 disclosed in FIG. 6A. By fully insulating the light emitting devices within the outer shell of the wheel hub 600, as disclosed hereinabove, the light emitting devices may be protected from heat, moisture, or other potentially damaging conditions during assembly/manufacturing of the wheel apparatus 607. Furthermore, it should be understood that the outer shell of the light up wheel hub may provide both a safety structure to surround the light emitting devices and a focusing structure that is configured to allow the light to be focused into the valleys 604*b* of the rim, or another desired portion of the wheel assembly.

As seen in FIG. 6A-6B, the exact shape and characteristics of each sinusoidal ridge 604*a* may vary somewhat between wheel assembly embodiments. For example, each sinusoidal ridge 604*a* seen in FIG. 6A may appear to have a more flattened, larger contact surface 604*e* with the ground, whereas each sinusoidal ridge 604*a* seen in FIG. 6B may appear to have a more rounded, smaller contact surface 604*e* with the ground. It should be noted that the exact contact surface 604*e* curvature/area of each sinusoidal ridge 604*a* (and sinusoidal valley 604*b*) may be adjusted in accordance with the desired properties and application of the wheel assembly 607.

Figure 7:
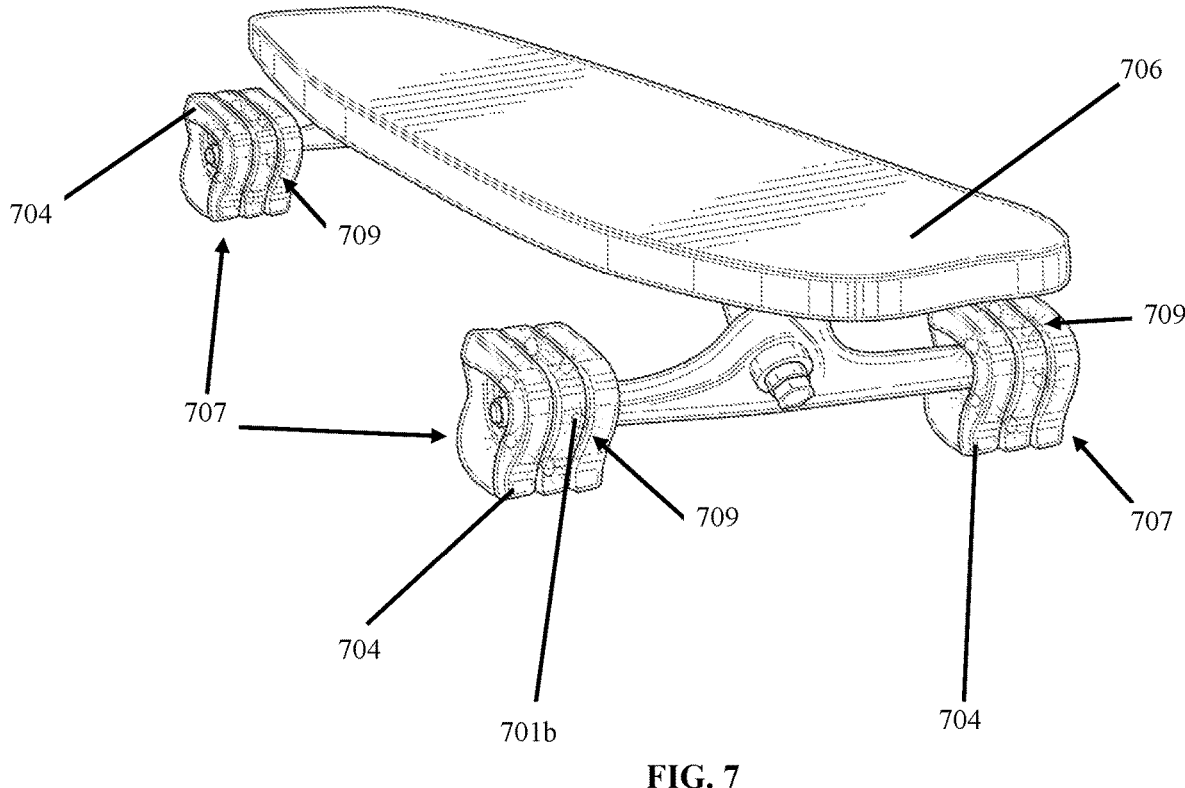
FIG. 7 illustrates a rear perspective view of a moving skateboard having light up wheels, according to an aspect.

FIG. 7 illustrates a rear perspective view of a moving skateboard 706 having light up wheels 707, according to an aspect. As described hereinabove, a skateboard 706 having the disclosed wheels 707 with sinusoidal rims 704 and light up wheel hubs, such as light up wheel hub 100 of FIG. 1A, may be configured to emit light 709 as a user rides on it. As seen in FIG. 7, upon the skateboard 706 reaching a certain velocity threshold/rpm for each wheel 707, the light up wheels 707 of the skateboard 706, and their corresponding light up wheel hubs, may rotate with sufficient speed to generate enough energy to emit light 709 from the electrically associated light emitting devices 701*b*. Not only may this help the disclosed skateboard 706 achieve a desired aesthetic effect, but it may also help improve the visibility of the skateboard 706, as well as its user, thus providing a notable safety benefit to the user while riding in low light conditions. As a result of the electrical power generation mechanism utilized to power the light emitting devices 701*b* of the light up wheel hub, this safety benefit may be provided to a user passively, without a need for batteries or other external power source. As such, this safety benefit may be both provided and maintained with minimal user intervention.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A wheel assembly configured to be rotationally engaged with a supported structure, the wheel assembly comprising:

a light up wheel hub having:
   a light up ring comprising:
      a ring body;
      a plurality of light emitting devices configured to be engaged with the ring body; and
      a generator body configured to be engaged with the ring body and in electrical communication with the plurality of light emitting devices; and
   an outer shell configured to be engaged with the light up ring, such that each light emitting device of the plurality light emitting devices is configured to be enclosed within the outer shell;
   wherein the generator body of the light up ring is configured to be rotationally engaged with the supported structure, such that rotation of the light up wheel hub about a wheel rotational axis is configured to generate electrical energy to power the plurality of light emitting devices; and
a sinusoidal wheel rim configured to surround and engage with the light up wheel hub, the sinusoidal wheel rim having:
   a plurality of sinusoidal ridges configured to be engaged with an outer radial perimeter of the light up wheel hub, wherein a corresponding sinusoidal valley is disposed between each adjacent pair of sinusoidal ridges;
   wherein each sinusoidal ridge of the plurality of sinusoidal ridges is configured to reciprocate around the outer radial perimeter of the light up wheel hub, such that each sinusoidal ridge of the plurality of sinusoidal ridges forms a continuous sinusoidal pattern around the outer radial perimeter of the light up wheel hub.

2. The wheel assembly of claim 1, wherein each light emitting device of the plurality of light emitting device is configured to be engaged with the ring body by a corresponding light clip, wherein a lateral offset of each light emitting device of the plurality of light emitting devices is configured to be selectively modified by adjusting a corresponding light clip.

3. The wheel assembly of claim 1, wherein the plurality of sinusoidal ridges comprises three sinusoidal ridges, wherein each sinusoidal ridge of the plurality of sinusoidal ridges is in phase with the other sinusoidal ridges of the plurality of sinusoidal ridges.

4. The wheel assembly of claim 1, wherein the plurality of light emitting devices comprises six light emitting diodes equidistantly spaced along a cylindrical outer surface of the ring body.

5. The wheel assembly of claim 1, wherein the outer shell is made of a translucent material.

6. The wheel assembly of claim 1, wherein the outer shell has a toroidal shape.

7. The wheel assembly of claim 1, wherein the sinusoidal wheel rim is made of polyurethane.

8. The wheel assembly of claim 1, wherein the wheel assembly is configured to be engaged with the supported structure by a magnetic bearing.

9. The wheel assembly of claim 1, wherein the wheel rim has a variable thickness as a result of its plurality of sinusoidal ridges and each corresponding sinusoidal valley, wherein light emitted from the plurality of light up devices appears most intense within each sinusoidal valley of the sinusoidal rim.

10. A wheel assembly configured to be rotationally engaged with a supported structure, the wheel assembly comprising:
a light up wheel hub having:
a light up ring comprising:
a ring body;
a light emitting device configured to be engaged with the ring body; and
a generator body configured to be engaged with the ring body and in electrical communication with the light emitting device; and
an outer shell configured to be engaged with the light up ring, such that the light emitting device is configured to be enclosed within the outer shell;
wherein the generator body of the light up ring is configured to be rotationally engaged with the supported structure, such that rotation of the light up wheel hub about a wheel rotational axis is configured to generate electrical energy to power the light emitting device; and
a wheel rim configured to surround and engage with the light up wheel hub, the wheel rim having:
a sinusoidal ridge configured to be engaged with an outer radial perimeter of the light up wheel hub, wherein the sinusoidal ridge is further configured to reciprocate around the outer radial perimeter of the light up wheel hub, such that the sinusoidal ridge forms a continuous sinusoidal pattern around the outer radial perimeter of the light up wheel hub.

11. The wheel assembly of claim 10, wherein the light emitting device is configured to be engaged with the ring body by a light clip, wherein a lateral offset of the light emitting device is configured to be selectively modified by adjusting the light clip.

12. The wheel assembly of claim 10, wherein the wheel rim and light up wheel hub are coaxially aligned with the wheel rotational axis.

13. The wheel assembly of claim 10, wherein the outer shell is made of a transparent material.

14. The wheel assembly of claim 10, wherein the outer shell comprises a main body portion having a right circular cylindrical shape and a tapered end portion engaged with the main body.

15. A wheel assembly configured to be rotationally engaged with a supported structure, the wheel assembly comprising:
a light up wheel hub having:
a light up ring comprising:
a ring body;
a light emitting device configured to be engaged with the ring body, wherein the light emitting device is configured to be engaged with the ring body by a light clip, wherein a lateral offset of the light emitting device is configured to be selectively modified by adjusting the light clip; and
a generator body configured to be engaged with the ring body and in electrical communication with the light emitting device; and
an outer shell configured to be engaged with the light up ring, such that the light emitting device is configured to be enclosed within the outer shell;
wherein the generator body of the light up ring is configured to be rotationally engaged with the supported structure, such that rotation of the light up wheel hub about a wheel rotational axis is configured to generate electrical energy to power the light emitting device.

16. The wheel assembly of claim 15, wherein the outer shell is made of polyurethane.

17. The wheel assembly of claim 15, wherein the outer shell is configured to protect the light emitting device from debris, fluids and impacts.

18. The wheel assembly of claim 15 further comprising a wheel rim, wherein the wheel rim is configured to allow the light emitted from the light emitting device to be emitted into an external environment beyond the wheel assembly.

19. The outer shell of claim 15 comprising a main body portion and a light pocket engaged with and protruding from the main body portion, wherein the light pocket is configured to surround and protect the light emitting device.

* * * * *